Sept. 7, 1965  R. F. TABER  3,204,463

FORCE OPERATED INSTRUMENT

Filed Sept. 18, 1962  2 Sheets-Sheet 1

INVENTOR.
RALPH F. TABER
BY
*Roland T. Booth*
ATTORNEY

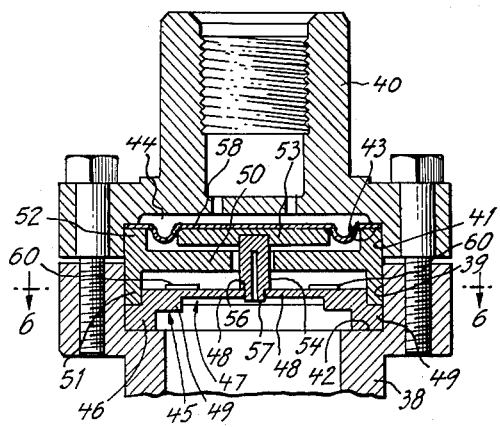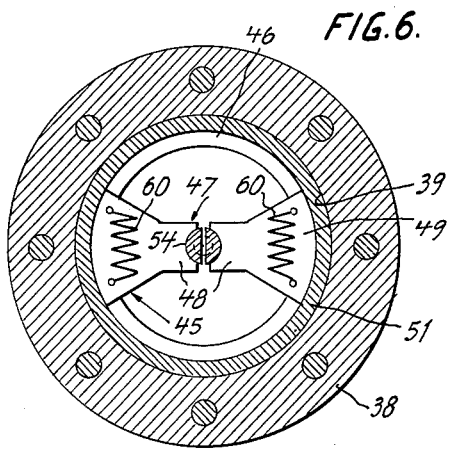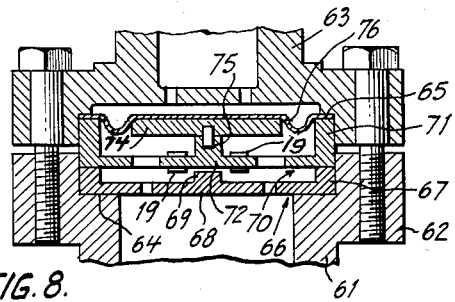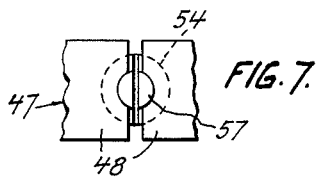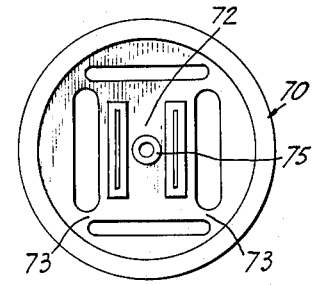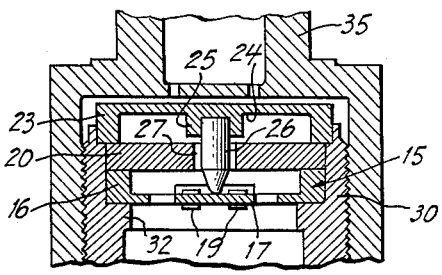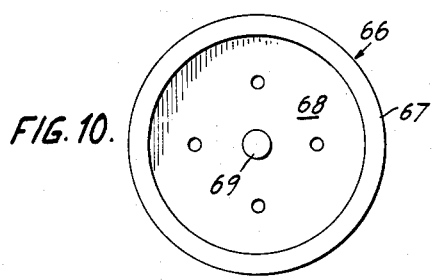

United States Patent Office 3,204,463
Patented Sept. 7, 1965

3,204,463
FORCE OPERATED INSTRUMENT
Ralph F. Taber, North Tonawanda, N.Y., assignor to Taber Instrument Corporation, North Tonawanda, N.Y., a corporation of New York
Filed Sept. 18, 1962, Ser. No. 224,359
3 Claims. (Cl. 73—398)

The present invention relates to improvements in instruments operated by force or responsive to variations in force, such as transducers and the like.

The present invention provides a force operated instrument in which the parts are constructed in such a way that when assembled they provide a very small compact unit which is highly sensitive to variations in force applied thereto. This small size is obtained by making the force transmitting and force responsive members of substantially flat plate-like members which may be assembled in superimposed spaced parallel relation in a recess in a rather shallow casing.

The invention provides a compact force responsive instrument having substantially flat force transmitting and force receiving members slidably mounted in a casing in an open ended recess therein with a divider member engaged between the force transmitting and force responsive members to form a heat insulating shield between the members and a stop for limiting movement of a diaphragm portion of the force transmitting member to a predetermined amount.

The invention provides an instrument having a casing formed with a recess open at one end and having a shoulder formed at the inner end thereof to provide a seat for receiving and supporting a force responsive member, a force transmitting member and a divider member slidably engaged in the recess in superimposed inter-engaged relation to form a rigid assembled instrument.

The invention provides an instrument in which a force responsive member is formed of a piece of flat sheet material having a marginal frame portion slidably engaging in a recess opening through one end of the casing. The force responsive member has a force receiving section mounted on a frame or supporting portion by connecting sections so that one portion may be moved relative to the other in accordance with variable pressures applied thereto for flexing and stressing the connecting sections and adjacent portions of the force receiving section and supporting section so the stress variations may be measured by force sensing means on predetermined portions of the force responsive member. The connecting sections which attach the force receiving section to the supporting section of the force responsive member are arranged to mount the two portions in spaced relation to each other in such a way that the application of force to one of these sections while the other is being supported by a casing or other means of support will apply torque bending and twisting stresses to the connecting sections for measurement by the sensing means.

The invention further provides a compact force operated instrument having a casing formed with a recess opening through one end for receiving superimposed force responsive, divider and force transmitting members in superimposed relation for convenient assembly and mounting in the casing in rigid relation. The force transmitting member may be formed to provide a combined force transmitting member and diaphragm for sealing the open end of the recess in the casing.

The invention provides a force transmitting member having a marginal frame portion and an imperforate diaphragm carried by the marginal frame portion and constructed to provide a closure for the end of the casing for transmitting forces to a force responsive member. The diaphragm is provided with a projection formed to cooperate with a stop means or divider plate carried by the casing for limiting movement of the diaphragm to a predetermined amount within the elastic limit of the material of which the diaphragm is formed so that overloads on the instrument will be prevented from damaging the force sensing means. The projection is also constructed to carry a suitable pin or the like having a rounded end for engaging the force responsive member for measurement by sensing means having portions mounted thereon.

The instrument may be constructed to mount an amplifier casing on the end opposite that carrying the diaphragm and a suitable cap member secured to the casing over the diaphragm for mounting the instrument on the end of a pipe connection to attach the instrument to a conduit system for measuring variations in fluid pressure therein. A flexible barrier may also be used with the force responsive member over the outer face of the diaphragm and adjacent portions of the end of the casing so the outer marginal portion is secured in sealed relation to the casing to protect the outer surface of the force responsive member from the effects of corrosive fluids.

The instrument also contemplates arranging the force responsive member adjacent to the force transmitting member and applying a pin or projection to the force responsive member engaging the force transmitting member in transmitting force between the two members while a divider stop member is applied at the inner side of the force responsive member having means to limit flexing movement of the force responsive member to prevent damage thereto.

In the drawings:

FIG. 4 is a cross-section taken substantially on line 4—4 of FIG. 3.

FIG. 5 is a cross-section similar ot FIG. 1 of a slightly modified form of instrument.

FIG. 6 is a transverse cross-section taken on line 6—6 of FIG. 5.

FIG. 7 is a detail plan view showing a fragment of the force responsive member to illustrate details of construction.

FIG. 8 is a transverse cross-section similar to FIG. 1 of another slightly modified form of instrument.

FIG. 9 is a plan view of the force responsive member as shown in FIG. 8; and

FIG. 10 is a plan view of the divider stop member shown in FIG. 8.

Figure 1:
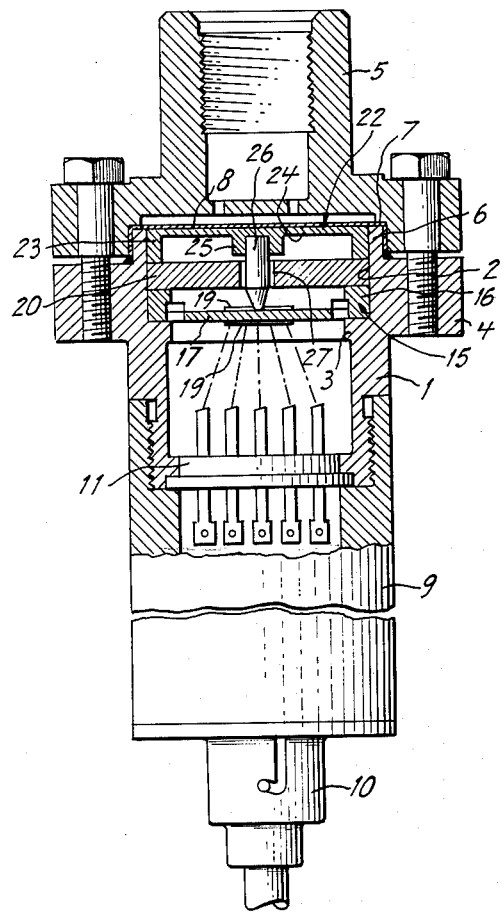
FIG. 1 is a vertical transverse section through a force operated instrument constructed according to the invention showing how a cap member may be detachably mounted on the casing by means of bolts and further showing how an amplifier housing may be attached to the opposite end of the casing.

According to the invention, a casing 1 of generally cylindrical form is formed with a recess 2 opening through one end and terminating at the inner end in an inwardly extending flange portion 3 forming a shoulder at the inner end of the recess. The outer portion of the casing at the end formed with the recess 2 is formed with a radial flange 4 having a plurality of screw threaded openings for receiving the threaded ends of bolts so that a cap member 5 may be detachably mounted on the open end of the casing. The casing 1 has a seating flange 6 at the end provided with recess 2 forming a seat opposed to a seating surface on the inner portion of cap 5 indicated at 7 for retaining the marginal portion of a flexible barrier 8 firmly engaged and sealed therebetween in fluid-tight relation. The flexible barrier 8 is in the form of a thin flexible metallic film or the like, that may be formed of a suitable material that is non-corrosive and which may have the marginal portions extended about the outer surface of seating flange 6 and suitably secured thereto in hermetically sealed relation. The cap member 5 is formed with a suitable passage communicating with the inner end thereof and opening against the outer face of flexible barrier 8. Cap member 5 may be attached to a suitable pipe connection forming part of a fluid system so the instrument may be used for measuring variations in fluid pressure in the system.

The opposite end of casing 1 is formed with a screw threaded portion for detachably receiving one end of an amplifier housing 9. A conventional connector 10 is detachably mounted on the free end of the housing for connecting electric wires to a socket on amplifier housing 9. The amplifier in housing 9 is electrically connected to a remotely located instrument used in connection with the sensing means for measuring variations in force applied to the instrument. A terminal block 11 is mounted in the end of casing 1 opposite to cap member 5 to provide terminal connections between the sensing means in casing 1 and the amplifier in amplifier housing 9 and is arranged so that terminal block 11 may be hermetically sealed in the opening in the end of casing 1.

Figure 3:
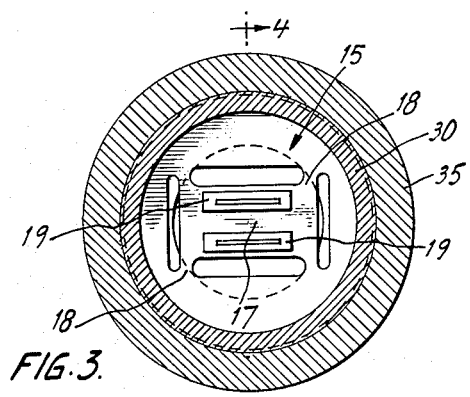
FIG. 3 is a cross-section taken substantially on line 3—3 of FIG. 2.

The invention provides a force responsive member or wafer 15 formed of a piece of substantially flat sheet material having a supporting frame or section 16 forming a marginal supporting frame section of annular form slidably engaged in recess 2 so that one side engages the shoulder formed by flange portion 3. A force receiving section or beam 17 is of substantially rectangular shape, as shown in FIGS. 3 and 4, and has its cross-section reduced from that of supporting frame 16 so that it will have a thickness of only a few-thousandths of an inch. The inner portion of supporting frame 16 will have the same thickness as force receiving section 17. Force receiving section or beam 17 has the corner portions joined or suspended on adjacent portions of supporting section 16 by strip sections or torque members 18 which extend in substantially aligned relation at opposite ends of force receiving section 17. The strip sections 18 support force receiving section 17 in spaced relation to the adjacent portions of supporting frame 16.

This forms a force responsive member in which application of force to the central portion of force receiving section 17 will apply a torque action to the force receiving section 17 and the connecting strip portions 18 connected thereto and to adjacent portions of supporting frame 16. The side and end portions of section 17 are spaced from the adjacent portions of supporting frame 16 by the slots at the sides and ends of section 17 between strip sections 18 as shown in FIG. 3. The force responsive member 15 is formed of a single piece of material which is machined to form section 17, the slots and strip portions 18.

A suitable sensing means of conventional form using semi-conductor or resistance strain gauges indicated diagrammatically at 19, is provided for measuring stress variations in force responsive member 15. The strain gauges 19 are mounted in pairs on opposite sides of force receiving section 17 in spaced relation at opposites sides of the center portion thereof, as shown in FIGS. 3 and 4. These strain gauges have suitable wire connections attached to separate terminals on terminal block 11 so that all four strain gauges 19 may be connected into a suitable electrical circuit with instruments for registering or recording stress variations applied to force responsive member 15.

A divider member or plate 20 in the form of a flat disc of sheet metal or other suitable material has a peripheral portion slidably engaged in recess 2 with one side thereof engaged with one side of supporting frame 16 of the force responsive member 15, as shown in FIG. 1.

The invention provides a force transmitting member 22 having a marginal supporting frame 23 slidably engaged in the recess 2 in casing 1. The marginal supporting frame 23 is of substantially cylindrical shape to fit the recess 2 and has a flexible diaphragm 24 secured to the outer edge at one side thereof to form an imperforate closure for the end of recess 2 in which the outer surface of the diaphragm will lie in substantially coplanar relation with the seating surface of seating flange 6. The force transmitting member 22 is formed of a piece of sheet material having a central portion reduced in thickness to a substantially thin flexible imperforate structure forming the flexible diaphragm 24. The central portion of diaphragm 24 is formed with a stop projection 25 carrying a projection or pin 26 having a rounded substantially pointed free end for engaging the center of force receiving section 17 to transmit variations in force applied to the diaphragm directly to force receiving section 17. The projection or pin 26 extends through an aperture 27 in divider plate 20, as clearly shown in FIGS. 1 and 2. When force transmitting member 22 is assembled in recess 2 of the casing 1 with divider plate 20 and force responsive member 15, the outer surface of the flexible diaphragm 24 will engage the inner side of flexible barrier 8 to fully support the flexible barrier over the end of recess 2 and receive variations in force applied to the barrier by fluid in cap 5 engaging the outer face of the barrier.

Figure 2:
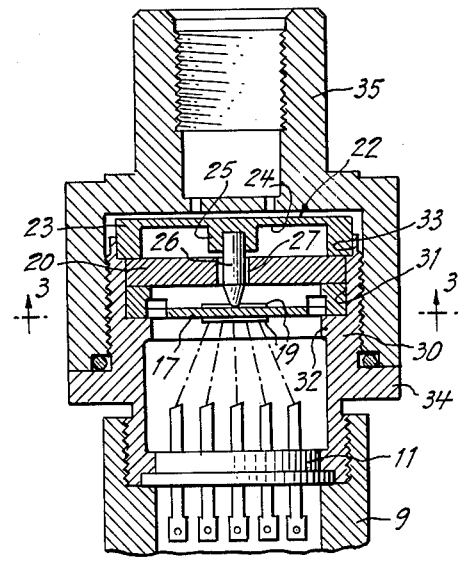
FIG. 2 is a view similar to FIG. 1 showing an instrument having a cap member mounted on the casing by a screw threaded connection and also showing a force transmitting member which also provides a diaphragm for sealing the open end of the casing about its marginal portion in providing a hermetically sealed instrument.

The construction shown in FIG. 2 has a casing 30 formed with a recess 31 and a flange 32 forming a shoulder at the end of the recess substantially identical with the construction shown in FIG. 1. The recess 31 opens outwardly through one end of the casing and at the outer end has a slightly enlarged portion indicated by the numeral 33. The force transmitting member, divider member or plate, and force responsive member shown in FIG. 2 are identical to the corresponding members shown in FIG. 1 and the same numerals are used to indicate these parts in FIG. 2. The pin or projection carried by the force transmitting member 22, as shown in FIG. 2, is also of the same construction, as that shown in FIG. 1. The force transmitting member 22 is of slightly larger diameter in the construction shown in FIG. 2 than divider member 20 or force responsive member 15. The periphery of force transmitting member 22 as shown in FIG. 2, slidably engages in the enlarged portion 33 of the recess in casing 30.

When force transmitting member 22 is assembled, as shown in FIG. 2, with divider member 20 and force responsive member 15 engaged with one another and against flange 32, suitable welding material is applied about the end of the casing portion and the outer surface of force transmitting member 22 for hermetically sealing and welding the member 22 to casing 30. The construction shown in FIG. 2 also uses a terminal block 11 in the end of the casing opposite force transmitting member 22 which may be mounted and hermetically sealed in the same manner, as described above in connection with FIG. 1 so that suitable electrical connections from the strain gauges of force responsive member 15 may be made with instruments in a remote location to the casing through the conductors carried by the terminal block which is of conventional form. The casing 30 has the outer surface adjacent connector block 11 threaded in the same manner as the casing shown in FIG. 1, to receive an amplifier structure as shown in FIG. 1, or a conventional form of cap member to provide a cover and support for a connector to detachably mount a cooperating connector similar to connector 10 where it may be desired to place the amplifier at a location remote from casing 30. It will be understood that this same arrangement may be used in connection with the construction shown in FIG. 1.

The exterior of casing 30, as shown in FIG. 2 is provided with a flange 34 and has the outer surface between the flange and the end of the casing adjacent to force transmitting member 22 threaded to threadably mount a cap member 35 on the casing over force transmitting member 22 and suitably formed for attachment to a suitable conduit for conveying fluid into the cap member for contact with the outer surface of force transmitting member 22 so variations in pressure of the fluid may be transmitted to force responsive member 15 for measurement. It will be understood that the difference in construction between the instrument, as shown in FIGS. 1 and 2, is principally to illustrate the application of a cap member to the casing by screw threads instead of by bolts. In screw threading cap member 35 onto casing 30 a suitable gasket is used between the end of the cap member and the flange 34 of the casing for sealing the cap member on the casing in fluid-tight relation.

The projection or pin 26, as shown in FIGS. 1, 2 and 4 has the free end formed of substantially conical shape, as shown in FIG. 4, with a rounded point for engaging the center of the force receiving section 17 at a location between strain gauges 19 mounted thereon to provide a substantially uniform application of stress variations to the force responsive member.

The modified construction shown in FIGS. 5 and 6 has a casing 38 formed with a recess 39 opening through one end thereof. An annular securing flange mounts a cap member 40 by means of bolts extending through openings in the securing flange corresponding to that formed on casing 38. Cap member 40 also has a recess 41 opening through the inner end thereof registering with and of the same size as recess 39 in casing 38. The casing 38 is formed to provide a shoulder 42 at the inner end of the recess 39 and cap member 40 is formed with a shoulder 43 at the inner end of recess 41 and a chamber 44 communicating with the passage in the cap member for applying fluid pressure to operate the force transmitting member.

A force responsive member 45 has a supporting frame 46 of cylindrical construction formed of a sheet metal plate carrying force receiving portions 48. One end of each of the portions 48 is attached to supporting frame 46 by connecting strip sections 49. The connecting strip sections 49 extend transversely between opposite portions of supporting frame 46 and lie in the same plane as the portion 46, but are formed of substantially thinner cross-section, as shown in FIGS. 5 and 6. Strip sections 49 extend in substantially diametrical relation between opposite sides of supporting frame 46, as clearly shown in FIG. 6.

A divider member 50 is formed with a transverse plate portion of suitable sheet material formed with a central aperture in the same manner as divider member 20. The marginal portion of divider member 50 is provided with flanges extending in both directions from the plate portion, the flange 51 engaging in a recessed seat portion formed in the outer marginal portion of supporting frame 46 and a flange 52 projecting outwardly beyond the end of casing 38 and forming a seating flange for engagement by shoulder 43 of cap member 40. The flange 52 forms a recess on one side of divider member 50, as shown in FIG. 5, which receives force transmitting member 53 formed of a disc arranged to fit in the recess in such a way that the outer surface extends in substantially coplanar relation with the end of flange 52 while the inner surface is spaced a slight distance from divider member 50 which forms a stop for limiting movement of force transmitting member 53 to a predetermined amount in order to prevent damage to the instrument when it is subjected to excessive pressure. A projection 54 has one end mounted in force transmitting member 53 and the opposite end projecting through an aperture in divider member 50. The free end of projection 54 is formed with shoulders 56 for engaging the inner free ends of force receiving portions 48 while a spacing projection 57 extends into the space between the free ends of force receiving portions 48 to maintain the force transmitting member in centered relation. A flexible barrier 58 has one surface engaged with the outer surface of force transmitting member 53 and the marginal portion firmly clamped between shoulder 43 on cap 40 and the end of flange 52 of divider member 50 in fluid-tight relation.

Semi-conductor or resistance type strain gauges 60 are mounted adjacent to the juncture of force receiving portions 48 and connecting strip portions 49, as shown in FIG. 6, with suitable electrical connections extending to the usual conventional registering or recording equipment with terminal connections, of a character shown in FIGS. 1 and 2, applied to the free end of the casing which are omitted from the illustration in FIG. 5.

Another modification of the invention is shown in FIGS. 8 to 10. A casing 61 is made the same as the casing 1 in FIG. 1 and has a radial flange 62 provided with threaded bores to receive bolts for attaching the cap member 63 thereto. Casing 61 has a recess opening through the flanged end and terminates in shoulder 64 at the inner end. Cap member 63 has a shoulder 65 at the end of a recess opening through the inner side thereof in opposed aligned relation to the recess in casing 61 and shoulder 64.

A divider stop member 66 is formed of a flat metal plate machined to form an annular supporting frame 67 carrying the plate portion 68 formed with a stop projection 69 in the center portion. Divider member 66 is slidably engaged in the recess in casing 61 in transversely extending relation as shown in FIG. 8 with the end of supporting frame 67 seated on shoulder 64. The stop projection 69 extends upwardly or toward cap member 63 in the assembled relation of the divider member.

A force responsive member 70 has a supporting frame 71 about the outer margin carrying a spaced transversely extending portion formed to provide a force receiving section 72 supported on the supporting frame 71 by connecting strip or torque sections 73. The connecting strip sections 73 extend outwardly from opposite sides of force receiving section 72 at opposite ends as shown in FIG. 9 and are constructed the same as force responsive member 15 as shown in FIGS. 1 and 3. Force responsive member 70 is slidably mounted in the recess in casing 61 with supporting frame 71 seated against supporting frame 67 of divider stop member 66 and the recessed portion in supporting frame 71 facing outwardly toward cap member 63 to receive a force transmitting member 74. Force transmitting member 74 is in the form of a disc having the outer surface positioned in substantially coplanar relation with the outer end surface of supporting frame 71.

The central portion of force receiving section 72 is formed with a projection 75 for supporting force transmitting member 74 with a pin connection therebetween as shown in FIG. 8. This is the reverse of the structure shown in FIGS. 1 and 5. The strain gauges are located on opposite faces of section 72 on opposite sides of projection or pin 75 in the same manner as in FIGS. 1 and 4 and are connected to recording or registering instruments as hereinabove described.

A flexible barrier 76 has its marginal portion engaged between and retained in sealed relation on the end of casing 1 in engagement with supporting frame 71 by shoulder 65 on cap member 63 as shown in FIG. 8. The outer surface of the disc forming force transmitting member 74 supports flexible barrier 76 within supporting frame 71 so that variations in fluid pressure in cap 63 are transmitted through barrier 76 to force transmitting member 74 to force receiving section 72. This transmission of force to section 72 applies torque to connecting strip sections 73 as well as to section 72 on which the strain gauges are mounted to be sensitive to variations in torque or stress so that electrical energy is transmitted by the gauges to recording or registering instruments as above described in connection with the operation of the structures shown in FIGS. 1 and 2.

It will be understood that force receiving section 72 has its end and side edges between connecting strip sections 73 arranged in spaced relation to the adjacent portions of supporting frame 71 in providing a structure having torque stresses developed therein in the same manner as the structure shown in FIGS. 1 and 4.

The instrument shown in FIGS. 1 to 4 and 8 and 9 operates to measure fluid pressure by transmitting the pressure applied to the force transmitting member 22 in FIG. 1 or 74 in FIG. 8 through pin 26 in FIG. 1 or projection 75 in FIG. 8 to the force receiving section 17 in FIG. 1 or 72 in FIG. 8, respectively. The application of force to force receiving sections 17 or 72 causes these rectangular sections to bend or fold across the transverse central portion while the opposite ends of the sections 17 or 72 are held by the connecting strip sections. The connecting strip sections 18, FIG. 3 and 73 FIG. 9 are twisted to provide a pivotal type action when the center of the force receiving section is bent out of its normal plane by the application of force. This type of bending or folding of the force receiving section provides for linear deflection of the force receiving section. The strain gauges are mounted in spaced parallel relation along the opposite long sides of the force receiving section so the linear deflection of the force receiving section enables efficient measurement of the forces applied to the instrument.

With the arrangement shown in FIG. 8, the end of stop projection 69 on divider stop member 68 is spaced from the center portion of force receiving section 72 the desired distance for operation of the instrument in measuring pressure and force variations within the limits for which the instrument is constructed. When excessive forces are applied to the instrument, section 72 will engage stop projection 69 which will receive and distribute excessive pressures to prevent damage to the strain gauges and force responsive member 70. The same results are obtained by the structure shown in FIGS. 8 to 10 as in the previously described constructions with a slightly different arrangement of the stop and divider construction. The casing 61 has the end not shown opposite to that formed with the flange, constructed in the same manner as shown in FIG. 1 and is omitted from the illustration in FIG. 8. The construction shown in FIG. 8 may be used in locations where the instrument is not subjected to high heat by fluids in cap 63 and where it may be found more desirable to have the divider and stop combined and operating as above described.

With the several constructions shown in the drawing and hereinabove described it will be understood that a comparatively rigid and substantially flat force responsive member is provided in the form of a substantially flat strip or plate having a force receiving section and connecting sections to attach it to a supporting section arranged so that when variable forces are applied thereto by the force transmitting member, the different portions of the force responsive member will operate to produce a torsion stress in the connecting sections and adjacent portions of the other sections. These stresses provide a means for using a semi-conductor type of gauge element using a plurality of gauge members mounted on selected portions of the force responsive member and connected in circuit with a suitable amplifier and instruments for registering and/or recording variations in force applied thereto. The construction also provides a gauge construction in which a small and compact unit is provided having a divider plate between the force responsive member and the force transmitting member for absorbing and dissipating heat where the instrument is used for measuring variation in pressures in hot liquids or other fluids in view of the close proximity of the gauges to the force transmitting member and flexible barrier in the present gauge as compared with other types of conventional gauges. The divider member also provides a rigid support for limiting the movement of the force transmitting member to a predetermined amount for preventing excessive pressures from injuring the instrument by applying excessive stress to the force responsive member.

The invention further provides a casing construction together with a construction for the divider member, force responsive member and force transmitting member, that may be assembled one against the other in spaced parallel relation in a recess opening through one end of the casing member, so the parts of the instrument may be readily assembled into operative position and supported on a shoulder formed in the casing. By this construction of the several members, the instrument can be readily sealed hermetically in a convenient manner. The invention also provides structural parts that are relatively simple in construction and in view of which they may be manufactured at a relatively cheaper cost for construction and assembly of the parts into a completed instrument.

The invention claimed is:

1. In a force operated instrument having a casing formed with a compartment opening through one end, a force transmitting member mounted in one end of said compartment in said casing having a projection for engaging a force receiving section, the combination of a force responsive member mounted in said compartment formed of a sheet metal plate having a marginal supporting section engaging said casing for supporting said force responsive member in said casing, said plate having a plurality of slots formed therein to form a substantially rectangular force receiving section in the central portion thereof connected at opposite ends by alined connecting sections to said marginal supporting section, said force transmitting member having said projection engaging the central portion of said force receiving section for applying force thereto for lineally deflecting said force receiving section between opposite ends, whereby sensing means mounted along opposite side margins of said force receiving section in substantially parallel relation will measure variations in force transmitted thereto by said force transmitting member.

2. A force responsive member for a force operated instrument comprising a sheet metal plate formed to provide a marginal supporting section, said plate having a plurality of spaced parallel slots formed about the inner edge of said marginal section to form a centrally located rectangular force receiving section, and pairs of alined connecting sections at opposite ends connecting said force receiving section to said marginal section, whereby application of force to the central portion of said rectangular force receiving section will cause said force receiving section to bend at the central portion transversely of said section out of the plane of said plate while the ends of said force receiving section are held by said connecting sections so as to extend in angular relation to each other so that sensing means mounted along opposite side margins of said force receiving section will measure variations in force transmitted to said force responsive member by the lineal deflection of said force receiving section.

3. A force operated instrument comprising a casing formed with a cylindrical recess opening through one end and having a shoulder at the inner end of said recess, a force responsive member formed of a flat sheet metal plate having a cylindrical marginal section slidably engaged in the cylindrical recess in said casing with one side seated against said shoulder, having a force receiving section formed in the central portion of said plate spaced from said marginal section and attached at opposite ends by spaced connecting strip sections to said marginal section, a flat sheet metal divider plate having a cylindrical marginal portion slidably engaged in the cylindrical recess in said casing with the inner side of said marginal portion engaged with the side of the marginal section of said force responsive member opposite to said shoulder, a force transmitting member having an outer cylindrical marginal supporting frame slidably engaged in said cylindrical recess in said casing and seated against the outer marginal portion of said divider plate and having a transversely extending flexible diaphragm, a projection formed in the center of said diaphragm for engaging said divider plate and limiting flexing of said diaphragm to a predetermined amount, a pin mounted in the projection on said diaphragm extending through an aperture in said divider plate and engaging the central portion of said force receiving section, a cap member detachably mounted on the end of said casing over said cylindrical recess formed with a fluid passage for applying fluid pressure to the outside of said diaphragm whereby the force of said fluid pressure is transmitted by said diaphragm and pin to said force receiving section to linearly deflect the central portion of said force receiving section relative to the end portions thereof, and sensing means having portions mounted along opposite sides of said force receiving section for measuring the force applied to said force receiving section in the lineal deflection of said section.

References Cited by the Examiner

UNITED STATES PATENTS

| | | | |
|---|---|---|---|
| 3,022,672 | 2/62 | Dimeff et al. | 73—398 |
| 3,024,649 | 3/62 | Taber | 73—395 X |
| 3,045,490 | 7/62 | Dumas | 73—398 |

FOREIGN PATENTS 698,793 10/53 Great Britain.

RICHARD C. QUEISSER, *Primary Examiner.*

JOSEPH P. STRIZAK, *Examiner.*